(12) United States Patent
Vander Mey et al.

(10) Patent No.: US 9,378,504 B2
(45) Date of Patent: Jun. 28, 2016

(54) HIGHLIGHTING RELATED POINTS OF INTEREST IN A GEOGRAPHICAL REGION

(71) Applicant: GOOGLE INC., Mountain View, CA (US)

(72) Inventors: Christopher David Vander Mey, Seattle, WA (US); Bernhard Seefeld, San Francisco, CA (US); Nicholas Lee, Bothell, WA (US); Matthew Zhong Qing Wu, Seattle, WA (US); John Alistair Hawkins, London (GB)

(73) Assignee: GOOGLE INC., Mountain View, CA (US)

( * ) Notice: Subject to any disclaimer, the term of this patent is extended or adjusted under 35 U.S.C. 154(b) by 452 days.

(21) Appl. No.: 13/898,677

(22) Filed: May 21, 2013

(65) Prior Publication Data

US 2015/0187107 A1    Jul. 2, 2015

Related U.S. Application Data

(60) Provisional application No. 61/673,099, filed on Jul. 18, 2012.

(51) Int. Cl.

| | |
|---|---|
| *G06Q 30/00* | (2012.01) |
| *G01C 21/34* | (2006.01) |
| *G06Q 50/00* | (2012.01) |
| *G06F 17/30* | (2006.01) |
| *G01C 21/36* | (2006.01) |
| *G06T 11/60* | (2006.01) |

(52) U.S. Cl.
CPC ............ *G06Q 30/00* (2013.01); *G01C 21/3476* (2013.01); *G06Q 50/01* (2013.01); *G01C 21/3611* (2013.01); *G01C 21/3644* (2013.01); *G01C 21/3679* (2013.01); *G06F 17/3087* (2013.01); *G06F 17/30241* (2013.01); *G06F 17/30277* (2013.01); *G06F 17/30699* (2013.01); *G06F 17/30867* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 7,437,370 B1 | 10/2008 | Ershov | |
| 7,627,582 B1 | 12/2009 | Ershov | |
| 8,085,990 B2 | 12/2011 | Ofek | |
| 2004/0243459 A1 | 12/2004 | Geritz et al. | |
| 2005/0108213 A1* | 5/2005 | Riise | G06F 17/3087 |
| 2005/0171685 A1* | 8/2005 | Leung | G01C 21/3644 701/532 |
| 2007/0073748 A1 | 3/2007 | Barney | |
| 2008/0102857 A1 | 5/2008 | Kim | |
| 2009/0113296 A1 | 4/2009 | Lacy et al. | |

(Continued)

*Primary Examiner* — Jwalant Amin
(74) *Attorney, Agent, or Firm* — Marshall, Gerstein & Borun LLP

(57) ABSTRACT

A mapping system determines points of interest that are related to a selected point of interest within a digital map displayed at a client computing device. The system receives a request for mapping system data from a client computing device. The request indicates a selected point of interest (POI) that is displayed at a geographic location within the digital map. The selected POI corresponds to a list of words describing characteristics of the selected POI, and each word corresponding to the selected POI word includes a base score describing an importance of the word compared to a list of all words corresponding to displayable POIs. The system determines POIs that are related to the selected POI by comparing base scores of the selected POI words to base scores of related POI words, where the related POIs each include at least one word in common with the selected POI.

24 Claims, 9 Drawing Sheets

(56) References Cited

U.S. PATENT DOCUMENTS

| | | |
|---|---|---|
| 2009/0138365 A1 | 5/2009 | Mueller et al. |
| 2009/0234847 A1* | 9/2009 | Homma ............. G01C 21/3611 |
| 2009/0292605 A1 | 11/2009 | Kniaz et al. |
| 2009/0327267 A1 | 12/2009 | Wong et al. |
| 2010/0017237 A1 | 1/2010 | Dalesandro et al. |
| 2010/0049682 A1* | 2/2010 | Chow ................ G06Q 30/0631 706/46 |
| 2010/0182145 A1 | 7/2010 | Ungari |
| 2010/0293035 A1 | 11/2010 | Athsani et al. |
| 2011/0047145 A1 | 2/2011 | Ershov |
| 2011/0047509 A1* | 2/2011 | Arrasvuori ......... G01C 21/3673 715/815 |
| 2011/0072024 A1 | 3/2011 | Barney |
| 2011/0109435 A1* | 5/2011 | Bickel ................ G01C 21/3679 340/8.1 |
| 2011/0153654 A1* | 6/2011 | Lee ................... G06F 17/30684 707/769 |
| 2011/0154404 A1 | 6/2011 | Piepenbrink et al. |
| 2011/0313954 A1 | 12/2011 | Zhao et al. |
| 2012/0209861 A1* | 8/2012 | Narasimha ............. G06N 99/05 707/750 |
| 2013/0166480 A1* | 6/2013 | Popescu ............... G06N 99/005 706/12 |

* cited by examiner

HIGHLIGHTING RELATED POINTS OF INTEREST IN A GEOGRAPHICAL REGION

CROSS-REFERENCE TO RELATED APPLICATION

The benefit under 35 U.S.C. §119(e) of U.S. Provisional Patent Application No. 61/673,099, filed Jul. 18, 2012, is hereby claimed, and the disclosure is incorporated herein by reference.

FIELD OF TECHNOLOGY

The present invention relates to electronic mapping systems. More specifically, the present invention relates to highlighting related points of interest on a map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently available mapping systems allow users to search for points of interest within a map field of view. These mapping systems compare the current field of view and the search term against a database of points of interest. The mapping system plots the points of interest containing the search term within the current field of view. These mapping systems suffer from only plotting results on the map that match the wording contained in the search and may, for example, return results unrelated to the user's search. For example, if a user searches for "coffee" the search results would only include points of interest named "coffee", and would exclude points of interest that may have the best coffee in town. These mapping systems may also suffer from displaying all of the search results within the map field of view without prioritizing the points of interest. However, there may be many points of interest containing the word "coffee" if the user zooms to a full view of a city.

Other mapping systems allow users to search with a category of points of interest within a map field of view. For example, a user could search for a particular category such as "coffee" and the mapping system compares the search category and the map field of view against a database of points of interest within that particular search category. While this system may include points of interest with higher relevance because system performs the search by categorization, if the system categorizes the points of interest incorrectly, or a particular point of interest has many categories, the search results become less relevant for the user. Furthermore, depending on the field of view of the map, there may be many points of interest that match the search category, and the system may display more results than the user needs or can process. In more sophisticated mapping systems, the mapping system ranks search results based on the distance from geographic center of the map field of view. However, using the center of the map field of view above may not meet the needs of the user. For instance, if the user does not have the map centered on the particular area they wish to search, the user may need to take the additional step of panning the map to a new location to approximate a geographical reference points to perform the search. Furthermore, a distance-ranking scheme may not capture the best search results for the user. For example, the best coffee shop may only be two miles away, but a distance ranking search result may provide nearby search results of a supermarket and a gas station that both sell coffee.

Some electronic mapping systems provide the ability to interact with a point of interest within a map field of view, such as interacting with a point of interest to bring up a phone number or an address. Other systems may capture user reviews of points of interest, such as restaurant reviews, and may include the ability to provide a map of the point of interest. These systems may include the ability to search for particular categories of points of interest within a map and then display user reviews of the point of interest based on user interaction with the map. Social networking systems may provide individual users the ability to indicate that they visited points of interest, and social networks may determine a level of relatedness of individual users to other individual users.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method or computer system may generally highlight nearby points of interest (POIs) on a map that have a level of relatedness to a selected point of interest. Relatedness is a measure of association or correlation between a particular POI and another POI. POIs may include businesses that provide services, landmarks, or other points of interest that may interest a user and that have a fixed physical location. Related POIs may include alternatives (such as other coffee shops in the area), compliments (things to do before and after, such as a bakery), accessories (ATMs, and parking lots), and miscellaneous highly rated POIs in the search area that the user may not have considered in the initial search. The method or system may determine the level of relatedness based upon past user interactions with the POIs. Past user interactions may include, for example, user reviews, social network interactions, and other data.

In one embodiment, a computer-implemented method may display points of interest that are related to a selected point of interest. The method may receive a request for mapping system data from a client computing device via a network. The request may indicate a selected point of interest (POI) and the selected POI may correspond to a list of words describing characteristics of the selected POI. Each selected POI word may include a base score describing an importance of the selected POI word compared to a list of all words corresponding to displayable points of interest (POIs). The method may also determine one or more POIs that are related to the selected POI. The related POIs may include a list of words describing characteristics of the related POIs and each related POI list of words may including at least one word that is common to a word within the selected POI list of words. Each related POI word may include the base score describing an importance of the related POI word compared to the list of all words. Further, the method may determine a total base score for each related POI. The total base score may include a sum of the base scores for each word of the related POI list of words that is common to a word within the selected POI list of words.

In a further embodiment, another computer-implemented method may display points of interest that are related to a selected point of interest. The method may receive a request for mapping system data from a client computing device via a network. The request may indicate a selected point of interest (POI) that is displayed at a geographic location within a digital map at the client computing device. The selected POI may correspond to at least one topical refinement category (TRC) stored in a TRC database and a plurality of known for terms (KFTs) stored in a KFT database. Each KFT may describe a characteristic of the selected point of interest, and each TRC may correspond to a TRC base score describing an importance of the TRC compared to a set of all TRCs stored in the TRC database. Each KFT may correspond to a KFT base score describing an importance of the KFT compared to a set of all KFTs stored in the KFT database. The method may then determine one or more POIs that are related to the selected POI. The related POIs may each be displayed at other geographic locations within the digital map at the client computing device and include at least one TRC that is common to a TRC of the selected POI and at least one KFT that is common to a KFT of the selected POI. The method may then construct a KFT place graph. The KFT place graph may include the selected and related POIs as a first set of KFT place graph nodes, the KFTs of both the selected and related POIs as a second set of KFT place graph nodes, and an edge from each POI of the first set of KFT place graph nodes that includes a KFT of the second set of KFT place graph nodes. The method may also construct a TRC place graph including the selected and related POIs as a first set of TRC place graph nodes, the TRCs of both the selected and related POIs as a second set of TRC place graph nodes, and an edge from each POI of the first set of TRC place graph nodes that includes a TRC of the second set of TRC place graph nodes. The method may then determine KFT and TRC scoring candidate nodes from the sets of TRC and KFT nodes, wherein the TRC and KFT scoring candidate nodes include an edge to a node for the selected POI and an edge to one or more nodes for the related POIs. The method may also determine a relevance score for all TRCs of the TRC scoring candidate nodes, the relevance score comparing a TRC base score and a TRC base score having a highest base score of all TRC base scores for the POIs of the POI nodes having an edge to a TRC scoring candidate node. The method may determine a first intersection of the TRCs for all POIs of the POI nodes having an edge to a TRC scoring candidate node and the TRCs of the source point of interest. The method may determine a TRC relatedness score for each POI having a TRC in the first intersection, wherein each TRC relatedness score includes a minimum between a TRC relevance score for the selected POI and a TRC relevance score for the POI having the TRC in the first intersection, plus an inverse of a number of POIs that include the TRC. The method may then determining a relevance score for all KFTs of the KFT scoring candidate nodes, the relevance score comparing a KFT base score and a KFT base score having a highest base score of all KFT base scores for the POIs of the POI nodes having an edge to a KFT scoring candidate node. The method may determine a second intersection of the KFTs for all POIs of the POI nodes having an edge to a KFT scoring candidate node and the KFTs of the source point of interest. The method may then determine a KFT relatedness score for each POI having a KFT in the second intersection, wherein KFT relatedness score includes a minimum between a KFT relevance score for the selected POI and a KFT relevance score for the POI having the KFT in the second intersection, plus an inverse of a number of POIs that include the KFT. The method may then determine a total relatedness score including a sum of the TRC relatedness score and the KFT relatedness score, and send instructions to the client computing device, the instructions causing the client computing device to plot related POIs within the digital map displayed at the client computing device. The plotted, related POIs include a total relatedness score above a threshold.

In a still further embodiment, a computer system may determine points of interest that are related to a selected point of interest displayed within a digital map of a geographic area on a client computing device. The system may comprise one or more processors, one or more memories coupled to the one or more processors, and one or more databases communicatively coupled to the one or more processors. The databases may store text words describing characteristics of points of interest (POIs), each POI displayable within the digital map. The one or more memories may include computer executable instructions stored therein that, when executed by the one or more processors, cause the one or more processors to perform various tasks. For example, the instructions may cause the processor(s) to receive a request for mapping system data from the client computing device via a computer network. The request may indicate a selected point of interest (POI) that is displayed at a geographic location within the digital map at the client computing device. The selected POI may correspond to a list of words stored in a database, the list of words describing characteristics of the selected point of interest, and each selected POI word including a base score describing an importance of the selected POI word compared to a list of all words within a database and corresponding to displayable POIs. Further instructions may cause the processor(s) to determine one or more POIs that are related to the selected POI. The related POIs may each be displayed at other geographic locations within the digital map at the client computing device and include a list of words describing characteristics of the related POIs. Each related POI list of words may include at least one word that is common to a word within the selected POI list of words, and each related POI word may include the base score describing an importance of the related POI word compared to the list of all words. Still further instructions may cause the processor(s) to determine a total base score for each related POI. The total base score may include a sum of the base scores for each word of the related POI list of words that is common to a word within the selected POI list of words. Still further, the instructions may cause to processor(s) to send instructions to the client computing device to cause a processor of the client computing device to plot all related POIs within the digital map displayed at the client computing device. The plotted, related POIs may include a total base score above a threshold.

In a still further embodiment, an apparatus may display points of interest that are related to a selected point of interest. The apparatus may include receiving means to receive a request for mapping system data from a client computing device via a network. The request may indicate a selected point of interest (POI) and the selected POI may correspond to a list of words describing characteristics of the selected POI. Each selected POI word may include a base score describing an importance of the selected POI word compared to a list of all words corresponding to displayable points of interest (POIs). The apparatus may also include determining means to determine one or more POIs that are related to the selected POI. The related POIs may include a list of words describing characteristics of the related POIs and each related POI list of words may including at least one word that is common to a word within the selected POI list of words. Each related POI word may include the base score describing an importance of the related POI word compared to the list of all words. Further, the apparatus may include further determining means to determine a total base score for each related POI. The total base score may include a sum of the base scores for each word of the related POI list of words that is common to a word within the selected POI list of words.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
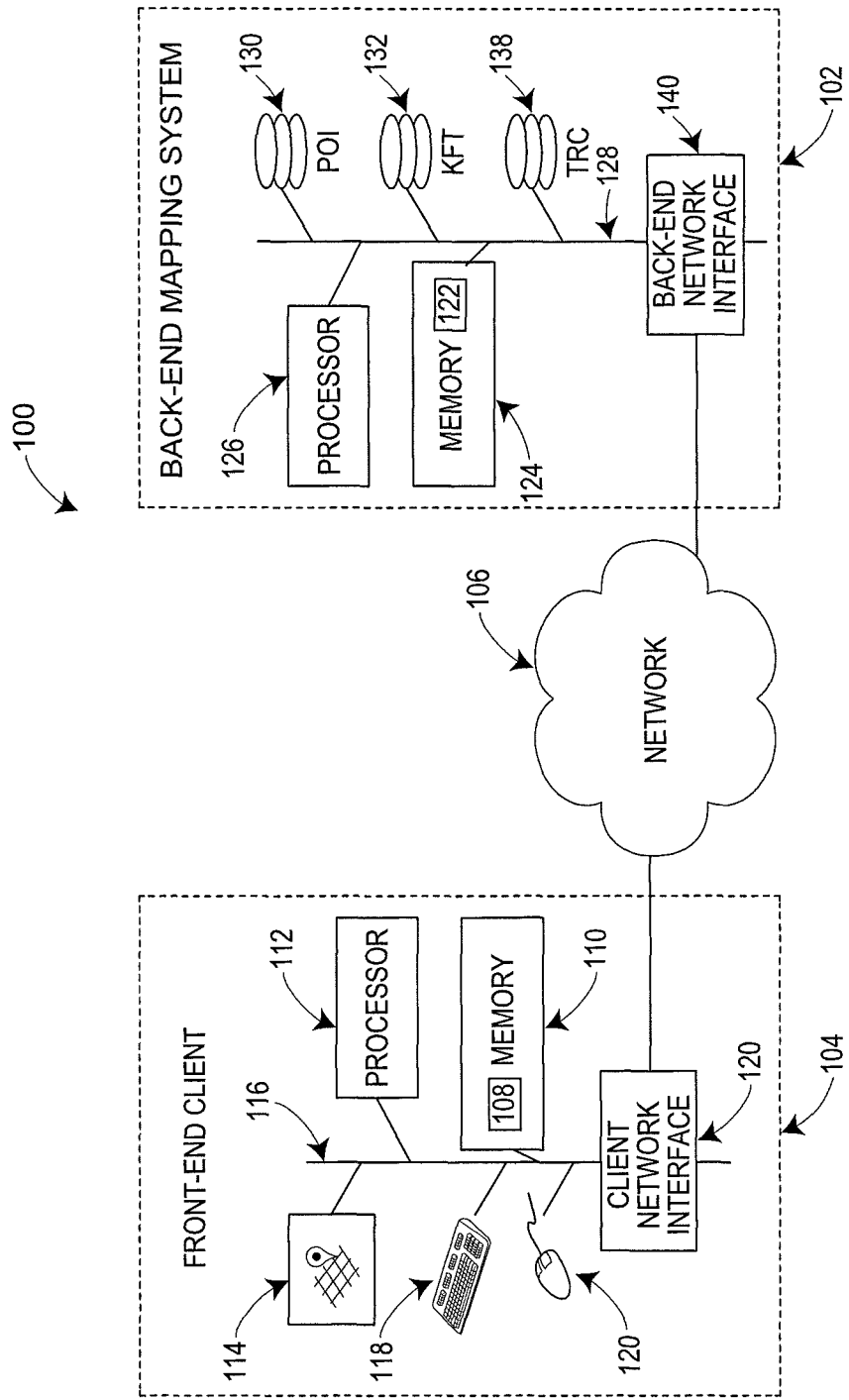
FIG. 1 is a high-level view of a system for highlighting points of interest within a digital map where the highlighted points of interest are related to a selected point of interest.

With reference to FIG. 1, a system 100 may generally highlight nearby points of interest (POIs) on a map that have a level of relatedness to a selected point of interest. Relatedness is a measure of association or correlation between a particular POI and another POI. POIs may include businesses that provide services, landmarks, or other points of interest that may interest a user and that have a fixed physical location. Related POIs may include alternatives (such as other coffee shops in the area), compliments (things to do before and after, such as a bakery), accessories (ATMs, and parking lots), and miscellaneous highly rated POIs in the search area that the user may not have considered in the initial search. The system 100 may determine the level of relatedness based upon past user interactions with the POIs. Past user interactions may include, for example, user reviews, social network interactions, and other data.

Generally, a back-end mapping system 102 may generate vector data in response to a search or other request from a front-end client computing device 104 and send the vector data to the client. The vector data may include data for various POIs that are represented on the map. To render a map image in a web browser, mapping application, or another application, the client device may request map data from mapping system 102 via a communication network 106. In response, the map system 102 may provide vector data that describes map graphic content (roads, buildings, parks, terrain features, etc.) as well as POI (restaurants, stores, offices, hospitals, tourist attractions, etc.). More particularly, the vector data may specify various geometric shapes (e.g., using mathematical descriptions, formulas, etc.) for map features and indicate how the client computing device should position these shapes for rendering various map graphic content and POI on the client computing device. The mapping system 102 may also specify which visual styles the client device should apply to various vector-based descriptions of map features.

The backend mapping system 102 may determine related points of interest in response to the request from a front-end client-computing device 104. The request may include a source point of interest (i.e., a search term) that the backend mapping system 102 may use to identify the related points of interest from all points of interest in the current boundaries of a map that is displayed at the front end 104. The system 100 may then display the related points of interest to the user at the front-end client device 104 via a network 106.

The front-end client 104 may include a mapping module 108 stored in memory 110 including instructions executed by a processor 112 for rendering digital maps with related places in a display device 114. A client system bus 116 may interconnect the display 114, and various input devices (e.g., a keyboard 118, a mouse 120, etc.) to allow a user to interacting with the system 100. The client system bus 116 may also connect the processor 112 to the memory 110 and a client network interface 120 may act as a hub between the client system bus 116 and the network 106.

The back-end mapping system 102 may include a related places module 122 stored in a memory 124 including instructions executed by a processor 126 for determining various related places for display at the client device 104. The network 106 may connect the back-end system 102 to the front-end client 104. The back-end mapping system 102 may include a back-end system bus 128 that connects the processor 126 to the memory 124, a points of interest (POI) database 130, a known for terms (KFT) database 132, and a topical refinement categories (TRC) database 138. A back-end network interface 140 may act as a hub between the back-end system bus 128 and the network 160.

The user may interact with the front-end client 104 and mapping module 108 to provide map search terms and other inputs to the back-end mapping system 102 and related places module 122. The related places module 122 may include instructions that, upon execution by the processor 126, determine and transmit the related points of interest to the front-end client 104 using the network 106. The mapping module 108 may include instructions that, when executed by the processor 112, may render a map on the display 114 that is similar to the example application window illustrated in FIG. 2. The map rendered on the display 114 may include the source point of interest and related points of interest.

Figure 2:
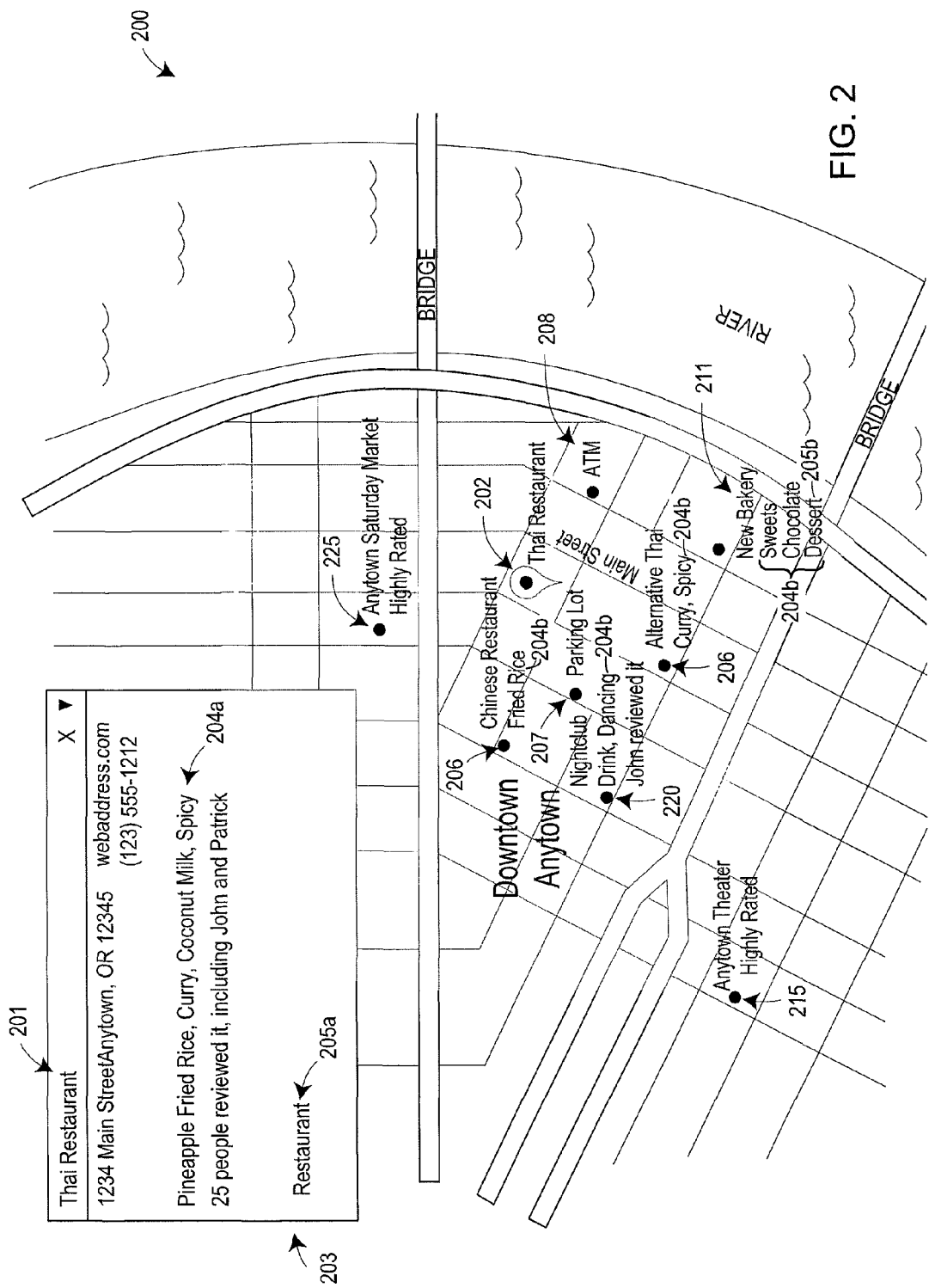
FIG. 2 is an illustration of a digital map including a source point of interest and related points of interest.

Turning to the example application window in FIG. 2, the mapping module 108 may also include instruction to cause the front-end client 104 to display a digital map 200 of a downtown area of a particular city. The user may interact with the map in a number of ways to send data related to a source point of interest from the front-end client 104 to the back-end mapping system 102. In some embodiments, a user may enter a search term 201 for a source point of interest in a search box and cause the client 104 to send the entered term(s) 201 to the back-end system 102. Alternatively, the user may click or hover-over a particular point of interest 202 on the map 200 to provide a data related to a source point of interest to the back-end system 102. The user may also select a source point of interest that causes the system 100 to highlight and/or display a text window 203 showing basic information about the source point of interest. In some embodiments, the basic information includes the address, phone number, and website of the source point of interest. The text window 203 may also include other information about the selected source point of interest 202. In some embodiments, the text window 203 may include information such as text related to user reviews of the selected POI 202, basic location and contact information, hours of operation, text collected by the system 100 from various websites related to the web presence of the selected POI 202, etc. In further embodiments, the text box 203 may include Known for Terms (KFTs) 204*a* and Topical Refinement Candidates (TRCs) 205*a* in the text window 203.

Generally, the system 100 may identify KFTs 204*a* within lists of words associated with each point of interest such as descriptions, reviews, web search terms, and social networking data. The lists of words may include terms describing the category for each point of interest to add further similarity to the search results. For example, a restaurant may specialize in tiramisu or cocktails. The system 100 may also use Topical Refinement Candidates (TRCs) 205*a* from written descriptions of the selected point of interest 202 to determine various alternatives and compliments to the selected point of interest 202, as described herein. The TRCs may generally describe a category of the POI. For example, a Thai restaurant may include the TRC "Restaurant" and a nightclub may include the TRC "bar."

The related places module 122 also include instructions to process the search term 201 and cause the mapping module 108 to display various alternatives to the search term 201. For example, one alternative to the search term "Thai Restaurant" may include the Chinese Restaurant 206 that includes the shared KFT 204*b* of "Fried Rice" beneath the title, as well as the Alternative Thai 207 that includes the shared KFTs 204*b* of "Curry" and "Spicy" beneath the title. These points of interest 206, 207 may also share a Topical Refinement Category (TRC) 205*a* (e.g., "restaurant"), to ensure the alternative points of interest meet needs that are similar to the search term 201. In some embodiments, the text window 203 may not display TRCs 205*a* beneath the title of the point of interest. Thus, the user may explore alternatives to the source point of interest within a nearby geographical area that meet their needs.

The system 100 may also anticipate the inherent needs of the user based on the source point of interest 201 and meet those needs without requiring the user to state the need explicitly. For example, if the user searches for a restaurant, the user may inherently require a parking lot for their car if they are driving, or an ATM to withdraw cash for payment. The user would typically be required to take additional action with the map to meet these inherent or "accessory" needs. Often, these accessory needs may not be immediately obvious to the user because the user may be unaware of a scarcity of parking, or that particular restaurants require payment in cash. By anticipating and plotting these accessories on the map for a particular source point of interest, the related places module 122 may include instructions to generate a map that meets the needs of the user without requiring the user to take additional steps. In some embodiments, the system 100 may use KFTs 204*a* and/or TRCs 205*a* to identify accessories related to the source point of interest 201. The system 100 may also use a zoom level of the map and other user context (e.g., if the user requested driving directions, if the user lives in another part of town, etc.) to associate accessories with the source point of interest 201.

The related places module 122 may also include instructions to plot other accessories on the map 200. For instance, a parking lot 207 near the source point of interest 202, as well as an ATM 208 may be accessories to the source point of interest 202. These accessories may not have matching KFTs beneath the title, similar to alternative points of interest. The system 100 may also use KFT 204 and TRC 205 data to present accessories to the user on the map 200. For instance, if the ATM 208 is near the Thai Restaurant 202, and the Thai Restaurant 202 only takes cash, then the ATM 208 may have a KFT including "Thai Restaurant" associated with the ATM 208. In a similar way, the ATM 208 may have a TRC such as "Banking" which may be associated with a "TRC of "Restaurant" when assigning accessories because cash-only restaurants may require banking services.

While accessories may enhance a user's experience with the primary point of interest, and alternatives may provide more options to the user than the primary point of interest, compliments may identify points of interest to visit before or after visiting the primary point of interest. For example, if the user visits the Thai Restaurant, the user may also be interested in visiting POIs that compliment visiting a Thai restaurant. For example, a POI that is complimentary to a Thai restaurant may be a bakery for dessert, a theater for a show, a nightclub for a drink or other activities, etc. Generally, compliments are not alternatives to the source point of interest 201. For instance, a user performing a search for a Thai restaurant would likely not visit a bakery instead of the Thai restaurant. Compliments may include points of interest that go well with the Thai Restaurant and generally supplement the user's experience with the source point of interest. Compliments may take advantage of the tendency for users that are co-located with the primary point of interest to be interested in doing other things in the area.

With continued reference to FIG. 2, the system 100 may include instructions to plot compliments on the map 200, such as a "New Bakery" 211, the "Anytown Theater" 215, and the "Nightclub" 220. Like the Known for Terms 204*a* of the primary point of interest 202, each of the compliments may also have Known for Terms (KFTs) 204*b* associated with the points of interest directly beneath the title, such as "Sweets" and "Chocolate" for the "New Bakery" 211, and "Drinks" and "Dancing" for the "Nightclub" 220. The KFTs 204*b* for the compliments 211, 215, 220 may be associated with the KFTs 204*a* of the primary point of interest 202. For instance, the system 100 may determine that, after visiting a restaurant with a KFT of "Spicy" (e.g., the "Thai Restaurant"), a user may be interested in visiting a POI with a KFT 204*b* such as "Chocolate." In a similar way, each compliment may also include a Topical Refinement Category (TRC) 205*b* such as "Dessert" for the "Bakery", or "Bar" for the "Nightclub" that instructions of the related places module 122 may use to identify further possible compliments to the primary point of interest. For example, the TRC 205*b* (not shown) for the "Thai Restaurant" 202 may be "Restaurant," and the "Anytown Theater" 215 may have a TRC 205*b* (not shown) of "Theater." The system 100 may include instructions to link TRCs for identification of compliments if, for example the TRC 205b "Restaurant" is always associated with the TRC 205b "Theater." The system 100 may include instructions to plot compliments on the map 200 based also on the user's context (e.g., whether the user lives nearby, the zoom level of the map, the time of day, season, personal interests, etc).

The system 100 may also include instructions to use the user's context and user ratings of points of interest within the geographical area of the primary point of interest to present highly rated nearby points of interest. These highly rated nearby points of interest may not have a high level of relatedness to the primary point of interest, but because they may be so highly rated by others, they may add to the experience of the user. For example, if a nearby "Anytown Saturday Market" 225 is very highly rated and the user happens to be from out of town, identifying the Saturday market may direct the user to that point of interest that they may not have considered in their initial search. These highly rated results can provide variety to the user's search and greatly add to the user's experience in the area. In some embodiments, the system 100 may include instructions to use a social networking service to which the user subscribes to render review information below the title of the point of interest. This review information may be attributed to members of the user's social network. Fr example, John's review of the Nightclub 220 or John and Patrick's review of the Thai Restaurant in the text box 203 where John and Patrick are members of the user's social network. This review information from social networking services may then contribute to displaying the related POI on the map 201 as a compliment, alternative, etc.

Figure 3A:
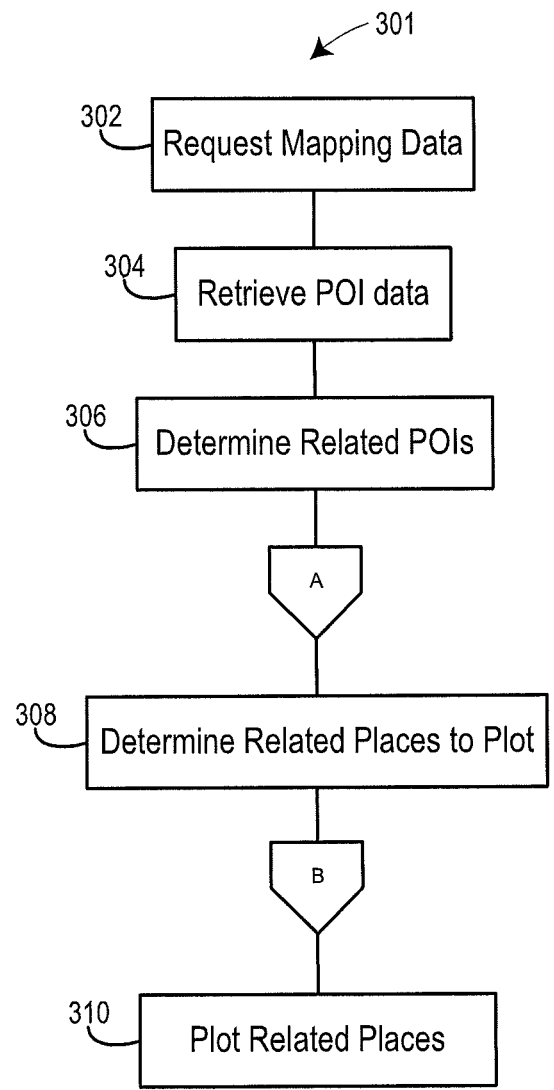
FIG. 3A is a flowchart illustrating a high level overview of a method for highlighting points of interest within a digital map where the highlighted points of interest are related to a selected point of interest.

FIG. 3A presents a computer-implemented process 301 for highlighting POIs that are related to a user search, as described herein. In one embodiment, the process 301 may allow a user to select a source point of interest 303 and various steps of the process 301 may cause the system 100 to retrieve, score, mix and filter related points of interest based on user context, and plot the related points of interest on a digital map. The process 301 may include one or more functions or routines in the form of computer-executable instructions that may be stored in a tangible, non-transitory computer-readable storage medium and executed using a processor of a computing device (e.g., the front-end client 104, the back-end mapping system 102, the computing device 801, etc.), or any combination of computing devices within the system 100). The routines may be included as part of any of the modules, processes, steps, etc., described in relation to the system 100, or as part of a module that is external to the system illustrated by FIG. 1. For example, the process 301 may be part of a browser application or an application running on a computing device as a plug-in or other module of the browser application. Further, the system 100 may employ the process 301 as "software-as-a-service" to provide a computing device with access to the back-end mapping system 102 or other remote computing system described herein. The process 301 may involve the front-end client 104 and the back-end mapping system 102.

At step 302, the back-end mapping system 102 may receive a search request or other data indicating a user request for mapping data. The user request may indicate a particular POI or a user interaction with a digital map 200 that is currently displayed on the front-end client 104. In some embodiments, the user may interact with the digital map 200 by clicking or hovering over a point of interest 202 already on the map 200, or the user may perform a text-based search for a particular point of interest in a text box 203, or any other action using mapping system data. Upon requesting, selecting, or interacting with a displayed POI, the front-end client 104 may also send the data corresponding to the selected point of interest 202 along with the boundaries of the map 200 to the back-end mapping system 102 via the network 106 and interface 140. As described above in relation to FIG. 2, the selected point of interest includes a Topical Refinement Category (TRC) 205a and a Known For Terms (KFT) 204a.

At step 304, user interaction may cause the back-end system 102 to retrieve mapping system data including point of interest (POI) data from the POI database 130 or other database and send the retrieved data to the client 104 via the network 106. The POI data may be selected for those POIs that both include a geographic location within the boundaries of the digital map 200 and that also meet the request criteria of step 302. The process 301 may retrieve the POI data from a POI database 130 using the selected point of interest 202 and boundaries of the map (e.g., the length and width of the displayed map, coordinates representing the corners of the displayed map, etc.).

In some embodiments, in response to a request for mapping data and POI data via a search request, a user interaction with POI data, or other action, the mapping module 108 at the client device 104 receives vector data that specifies both graphical characteristics of map features as well as POI data and, in some embodiments, POI data that describes KFTs and/or TRCs of various POIs that are related to the search term or selected POI. Vector data specifies the POI graphical features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The vector data may also represent POI text features describing POI KFTs, TRCs, and other text. The mapping module 108 may then apply POI data as appropriate to the specified line segment, so that the line segment is displayed with a particular title, description, category icon, KFT, TRC, etc.

As another example, the vector data may specify the contour of a building, and the corresponding POI data or modified POI data may specify the name, description, category icon (e.g., restaurant, landmark, hospital, etc.), etc., of the building. In other words, rather than receiving raster images from the back-end mapping system 102, the mapping module 108 may receive instructions for drawing a digital map image 200 and various POIs on an output device of the client computing device 104 and execute the instructions to generate a raster map image. In some cases, however, vector data also may include raster images when the client computing device cannot easily render the images from data a vector format. Upon receiving the vector data (including POI data) from the back-end mapping system 102, the system 100 may then use the provided POI data to render various POIs within the viewable boundaries of the rendered digital map 200.

At step 306, the system 100 may determine POIs that are related to the search terms 201 and/or a selected POI 202, as described in relation to FIG. 3B, below. From the POIs that are related to the search terms 201 and/or the selected POI, the process 301 may determine which POIs are most related to the terms/selected POI at step 308, as described in relation to FIG. 3C, below. At step 310, the process 301 may plot the POIs that the system 100 determines to be most related (i.e., compliments and alternatives) to the search terms 201/selected POIs 202 on the digital map 200.

Figure 3B:
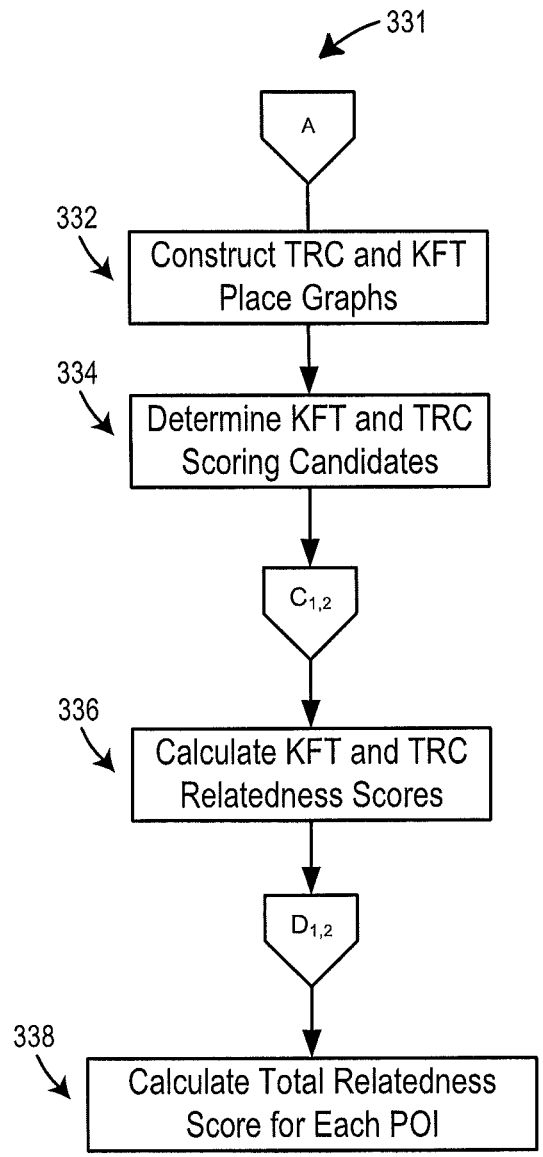
FIG. 3B is another flowchart illustrating a high level overview of a method for determining which POIs are related to search terms and/or a selected POI.

With reference to FIG. 3B, a process 331 may determine which POIs are related to the search terms 201 and/or a selected POI 202. In general, the process 331 may determine the related POIs by causing the system 100 to execute instructions to measure a relatedness score between topical refinement categories (TRCs) and known for terms (KFTs) related to the search terms 201 and/or the selected POI 202. The KFT database 132 and TRC database 138 may provide KFTs and TRCs associated with search terms 201 and/or a source point of interest 202 and other points of interest within the boundaries of the map 200. The process 331 may then calculate a "relatedness score" for the KFTs and TRCs that are related to the search terms 201 and/or selected POI 202 and then calculate a "combined relatedness score" for each POI. The client computing device may then display POIs having the highest combined relatedness score on the digital map 200 as alternatives, compliments, or accessories based on the score.

At step 332, the process 331 may execute instructions to cause the system 100 to construct place graphs 405, 505 (FIGS. 4A, 4B, 5A, and 5B) that depict the relationships between the search terms 201 or selected point of interest 202, the various POIs within the boundaries of the map 200, and the KFTs and TRCs of the POIs. The system 100 may execute instructions to develop the TRC place graph 405 using points of interest retrieved in step 304, above, to determine the TRCs and KFTs that are related to the selected POI 202/search terms 201.

Step 332 may cause the processor 112 or 126 to send a request to the TRC database 138 to retrieve TRCs associated with each point of interest retrieved at step 304 and store the associated TRCs in the memory 124. The instructions may also cause the processor(s) to generate a TRC place graph data structure 405 in the memory 110, 124. The TRC place graph data structure 404 may represent the relationships between each point of interest retrieved in step 304 and the TRCs associated with each point of interest. In some embodiments, the graph 405 includes a bipartite graph. For example, the vertices of the graph 405 may include two disjoint sets consisting of Points of Interest (POIs) 410, 412, 414, 416 and Topical Refinement Categories (TRCs) 420, 422, 424, 426. Every edge of the graph 405 may connect a POI vertex to a TRC vertex. That is, the set of POIs and TRCs are independent sets.

Figure 4A:
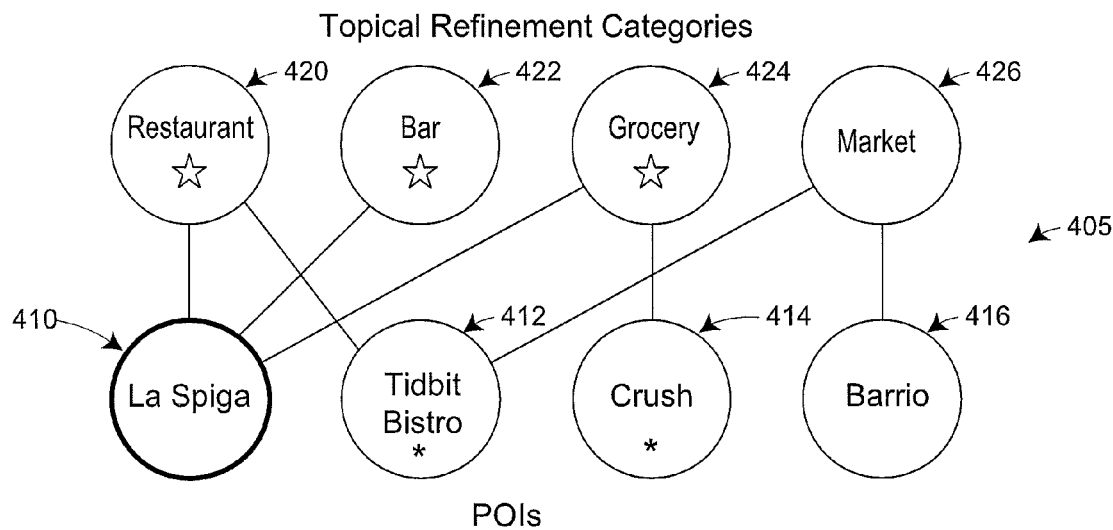
FIG. 4A is an illustration of a Topical Refinement Categories (TRC) place graph.

Turning to FIG. 4A, the TRC place graph data structure 405 includes a source point of interest "La Spiga" 410 and points of interest "Tidbit Bistro" 412, "Crush" 414, and "Barrio" comprising points of interest within the boundaries of the map 200. The TRC place graph 405 may further comprise TRCs "Restaurant" 420, "Bar" 422, "Grocery" 424, and "Market" 426 that are associated with the POIs 410, 412, 414, and 416. The TRC place graph 405 may include edges between points of interest and TRCs, representing the association between TRCs and points of interest. The association between a TRC and a point of interest may, for example, be a pointer in the memory 110, 124 between a point of interest object, for example "La Spiga" 410, and an associated TRC 205a, for example "Bar" 412. Therefore, the constructed TRC place graph 405 may include points of interest, associated TRCs, and pointers stored in a data structure in the memory 110, 124.

Step 332 may also cause the system 100 to execute instructions to develop a Known For Term (KFT) place graph 505 using points of interest retrieved in step 304. The instructions may cause the processor 112 or 126 to send a request to the KFT database 132 to retrieve KFTs associated with each point of interest retrieved at step 304 and store the associated KFTs in the memory 124. The instructions may also cause the processor(s) to generate a KFT place graph data structure 505 in the memory 110, 124. The KFT place graph data structure 505 may represent the relationships between each point of interest retrieved in step 304 and the KFTs associated with each point of interest. Like the TRC place graph 405 described above, the graph 505 includes a bipartite graph. For example, the vertices of the graph 505 may include two disjoint sets consisting of Points of Interest (POIs) 510, 512, and 514 and Known For Terms (KFTs) 520, 522, and 524. Every edge of the graph 505 may connect a POI node to a KFT node when that POI includes that KFT. That is, the set of POIs and KFTs are independent sets.

Figure 5A:
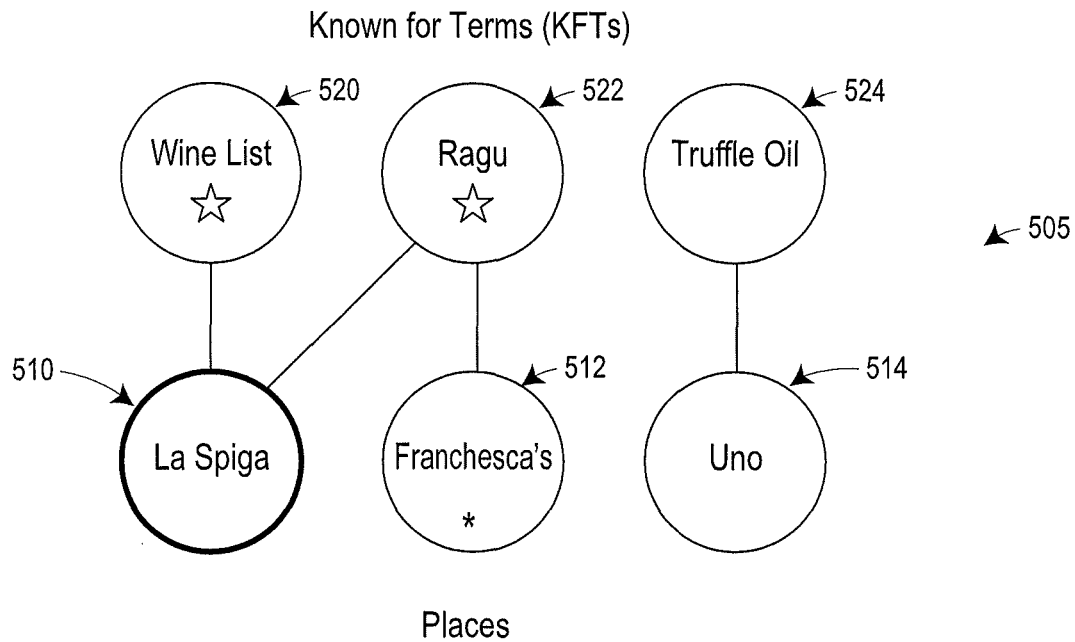
FIG. 5A is an illustration of a Known For Terms (TRC) place graph.

Turning to FIG. 5A, the Known for Term (KFT) place graph data structure 505 includes a source point of interest "La Spiga" 510 and points of interest "Franchesca's" 512, and "Uno" 514 comprising points of interest within the boundaries of the map 200. The KFT place graph 505 may further comprise the KFTs "Wine List" 520, "Ragu" 522, and "Truffle Oil" 524 that are associated with the POIs 510, 512, and 514. The KFT place graph 505 may include edges between points of interest and KFTs, representing the association between KFTs and points of interest. The association between a KFT and a point of interest may, for example, be a pointer in the memory 110, 124 between a point of interest, for example "La Spiga" 510, and an associated KFT 204a, for example "Ragu" 522. Therefore, the KFT place graph 505 may include points of interest, associated KFTs, and pointers stored in a data structure in the memory 110, 124.

Figure 4B:
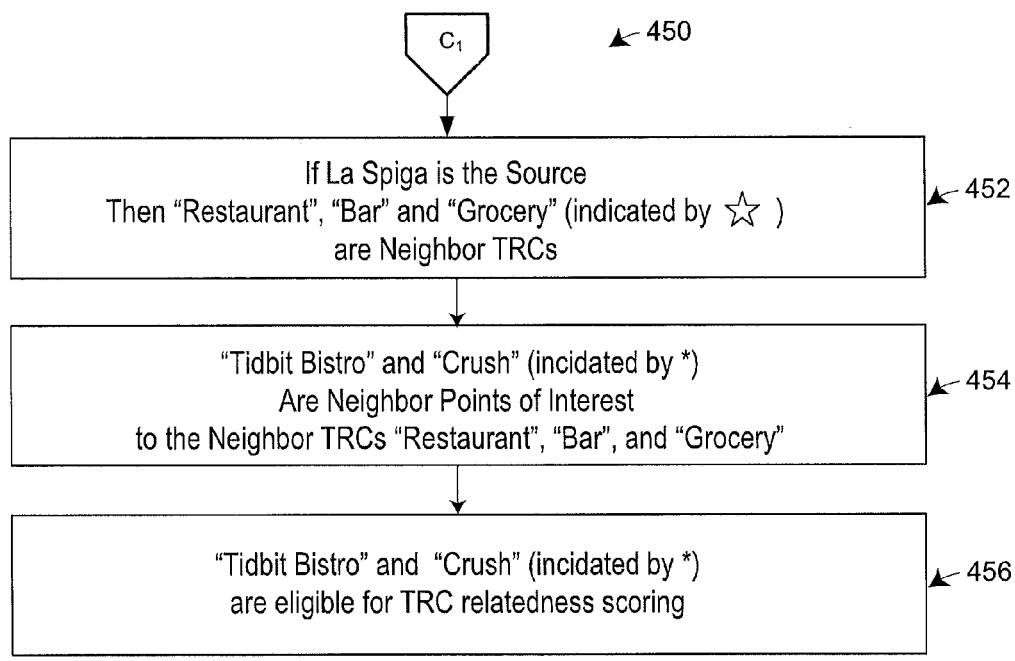
FIG. 4B is another flowchart illustrating a high level overview of a method for determining which points of interest within a TRC place graphs to score.

At step 334, the process 331 may execute instructions to cause the system 100 to determine KFT and TRC scoring candidates. For example, the instructions may cause the system 100 to determine which points of interest within the place graphs 405 and 505 to score. Turning to FIG. 4B, a process 450 may cause the processor 125, to execute instructions from the memory 110, 124. At step 452, the process 450 may determine that a source point of interest in the TRC place graph 405 stored in the memory 110, 124 is "La Spiga" 410 and the TRCs 205a directly linked to the source point of interest 410 (indicated with a star in FIG. 4A) may include "Restaurant" 420, "Bar" 422, and "Grocery" 424. The set of TRCs connected to the source point of interest 410 may be neighbor TRCs to the source point of interest 410. At step 420, the processor 112, 126 may execute instructions to identify all points of interest in the TRC place graph 405 that share a TRC with the source point of interest 410. The points of interest determined by the processor 112, 126 in step 420 may share at least one TRC with the source point of interest 410. For example, step 420 may include instructions to determine that the points of interest sharing a TRC with the source point of interest may be "Tidbit Bistro" 412 and "Crush" 414, indicated with an asterisk in FIG. 4A. Points of interest that share a TRC with the source point of interest 410 may be neighbor points of interest. At step 430, the process 450 may execute instructions to store the neighbor points of interest determined in step 420 in a data structure. These neighbor points of interest may now be eligible for calculating a relatedness score. The point of interest "Barrio" 416, for example, may not be eligible for calculating a relatedness score because it does not share at least one TRC with the source point of interest "La Spiga" 410 in the place graph 405 of FIG. 4A.

Figure 5B:
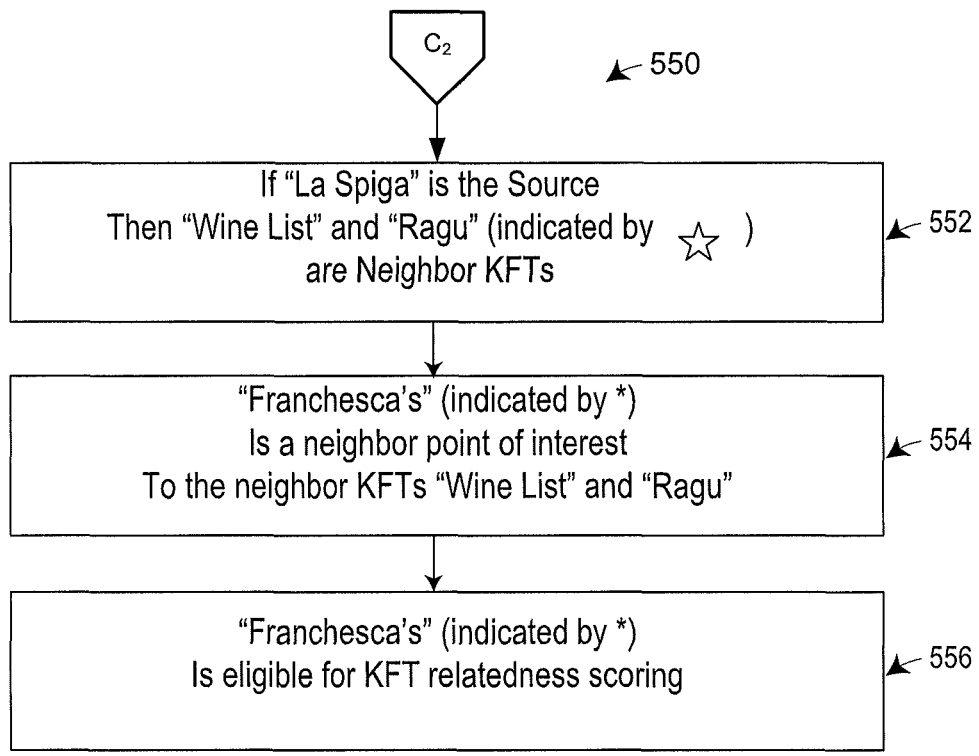
FIG. 5B is another flowchart illustrating a high level overview of a method for determining which points of interest within a KFT place graphs to score.

A process 550 (FIG. 5B) similar to the process 450 described above may cause a processor 112, 126 to execute instructions stored in a memory 110, 124 to determine one or more POIs that are KFT scoring candidates. Turning to FIG. 5B, the process 550 may include an instruction at step 552 to determine that the source point of interest in the KFT place graph 505 is "La Spiga" 510 and the KFTs directly linked to the source point of interest 510, indicated with a star in FIG. 5A, may be "Wine List" 520 and "Ragu" 522. KFTs connected to the source point of interest 510 may be neighbor KFTs to the source point of interest 510. Step 554 may include instructions to identify all points of interest in the KFT place graph 505 that share a KFT with the source point of interest 510. The POIs determined by the instructions of step 552 may share at least one KFT with the source point of interest 510. For example, step 554 may include instructions to determine that the POI "Franchesca's" 512 shares a KFT with the source point of interest "La Spiga" 510 (indicated with an asterisk in FIG. 5A). POIs sharing one KFT with the source point of interest 510 may be neighbor points of interest. At step 556, the process 550 may execute an instruction to store the neighbor points of interest determined at step 554 and the neighbor points of interest may now be eligible for calculating a relatedness score. The point of interest "Uno" 523, for example, may not be eligible for calculating a relatedness score because it does not share at least one KFT with the source point of interest "La Spiga" 510 in FIG. 5A.

Returning to FIG. 3B, at step 336, the process 331 may execute instructions to cause the system 100 to calculate a relatedness score for each point of interest. In some embodiments, process 331 may calculate the relatedness score from the set of KFT and TRC scoring candidates determined at step 334.

Figure 6A:
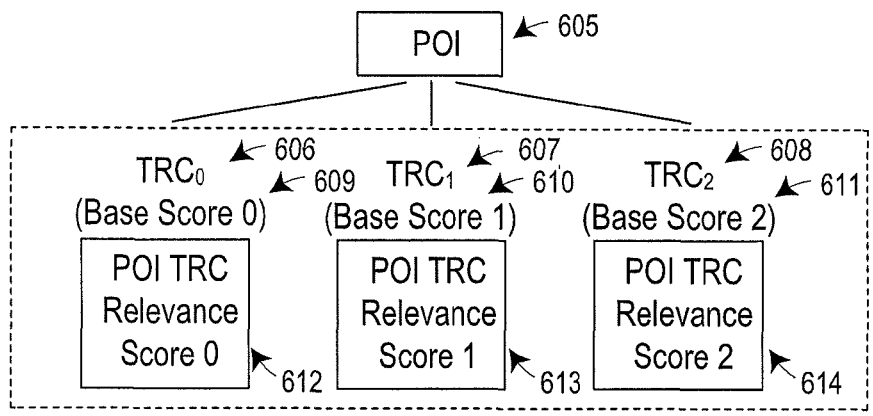
FIG. 6A is an illustration of one data structure representing a TRC scoring candidate point of interest.

Step 336 of the process 331 may include instructions to calculate a Topical Refinement Category (TRC) relatedness score for each TRC scoring candidate point of interest determined at step 334. FIG. 6A illustrates one representation of a TRC scoring candidate point of interest 605. Each TRC scoring candidate point of interest 605 may have one or more corresponding TRCs, for example $TRC_0$ 606, $TRC_1$ 607, and $TRC_2$ 608. Each corresponding TRC 606-608 may have a pre-assigned base score 609, 610, and 611 that may include a number value, a comparison value, a factor, or some other value that describes the importance of the TRC compared to the set of all possible TRCs stored and retrieved from the TRC database 138. For example, the TRC "Restaurant" may have a relatively higher base score compared to the TRC "Second-Hand Industrial Equipment Supplier" because the TRC "Restaurant" may have been associated with more searches performed in the past. The base score of the TRCs 606-608 may determine the ordering of the TRCs, where $TRC_0$ has the highest base TRC score. Step 336 may include instructions to convert each base score for the TRC to a TRC relevance score 612, 613, 614 for each TRC 606-608 that represents the TRC's relevance to a particular point of interest 605.

In one embodiment, a process 650 (FIG. 6B) may determine the TRC relevance scores 612-614 and TRC relatedness scores. Step 652 may include instructions to determine a relevance score between a TRC and a POI. In some embodiments, step 652 may include instructions to execute Equation 1. $R_{TRC}(p,i)$ represents the relevance score (e.g., 612, 613, 614, etc.) of the ith TRC associated with a selected point of interest (p). $Score_p(TRC_i)$ is the base score (e.g., 609, 610, 611, etc.) associated with $TRC_i$, and $score_p(TRC_0)$ is the base score that has the highest base score of all TRCs associated with a TRC scoring candidate point of interest.

$$R_{TRC}(p, i) = \frac{score_p(TRC_i)}{score_p(TRC_0)} \quad \text{Equation 1}$$

Step 654 may include instructions to calculate relevance scores (e.g., 612, 613, 614, etc.) for each TRC for each TRC scoring candidate point of interest. Step 656 may include instructions to determine the intersection of the TRCs associated with a particular TRC scoring candidate point of interest and the source point of interest TRCs. Step 658 may include instructions to calculate a total TRC relatedness score for a TRC scoring candidate POI. In some embodiments, step 658 includes instructions to execute Equations 2 and 3 (below) using TRC relevance scores $R_{TRC}(p,i)$ (e.g., steps 652 and 653) which are associated with members of the intersection determined at step 656.

$$POI\ relatedness_{TRC} \sum_{i=0}^{TRC_{selected\ POI} \cap TRC_{current\ POI}} \frac{\min[R_{TRC}(\text{selected } POI, i), R_{TRC}(\text{current } POI, i) + freq(TRC_i)]}{2} \quad \text{Equation 2}$$

$$freq(TRC_i) = \frac{1}{(\#\ of\ POIs\ with\ this\ TRC)^{K_1}} \quad \text{Equation 3}$$

The processor 125 may use the exponent $K_1$ in the denominator of Equation 3 to weigh the score more or less against TRCs that may be more or less common. For example, "Business" may be a very common TRC and, thus, Equation 3 may include an exponent $K_1$ to weigh the score against this TRC. Similarly, the exponent $K_1$ may weigh the score favorably toward a unique TRC.

Figure 7A:
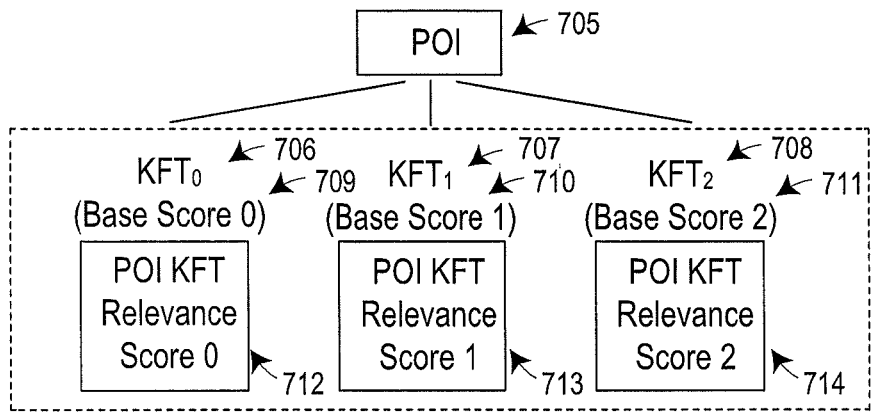
FIG. 7A is an illustration of one data structure representing a KFT scoring candidate point of interest.

Returning to FIG. 3B, step 336 may also calculate Known For Term (KFT) relatedness scores. FIG. 7A illustrates one representation of a KFT scoring candidate point of interest 705. Each KFT scoring candidate point of interest 705 may have one or more corresponding KFTs, for example $KFT_0$ 706, $KFT_1$ 707, and $KFT_2$ 708. Each corresponding KFT 706-708 may have a pre-assigned base score 709, 710, and 711 that may include a number value, a comparison value, a factor, or some other value that describes the importance of the KFT compared to the set of all possible KFTs stored and retrieved from the KFT database 132. For example, the KFT "Pad Thai" may have a relatively higher base score compared to the KFT "Industrial Process Control Systems" because the KFT "Pad Thai" may have been associated with more searches performed in the past. The base score of the KFTs 706-708 may determine the ordering of the KFTs, where KFT0 has the highest base KFT score.

Figure 7B:
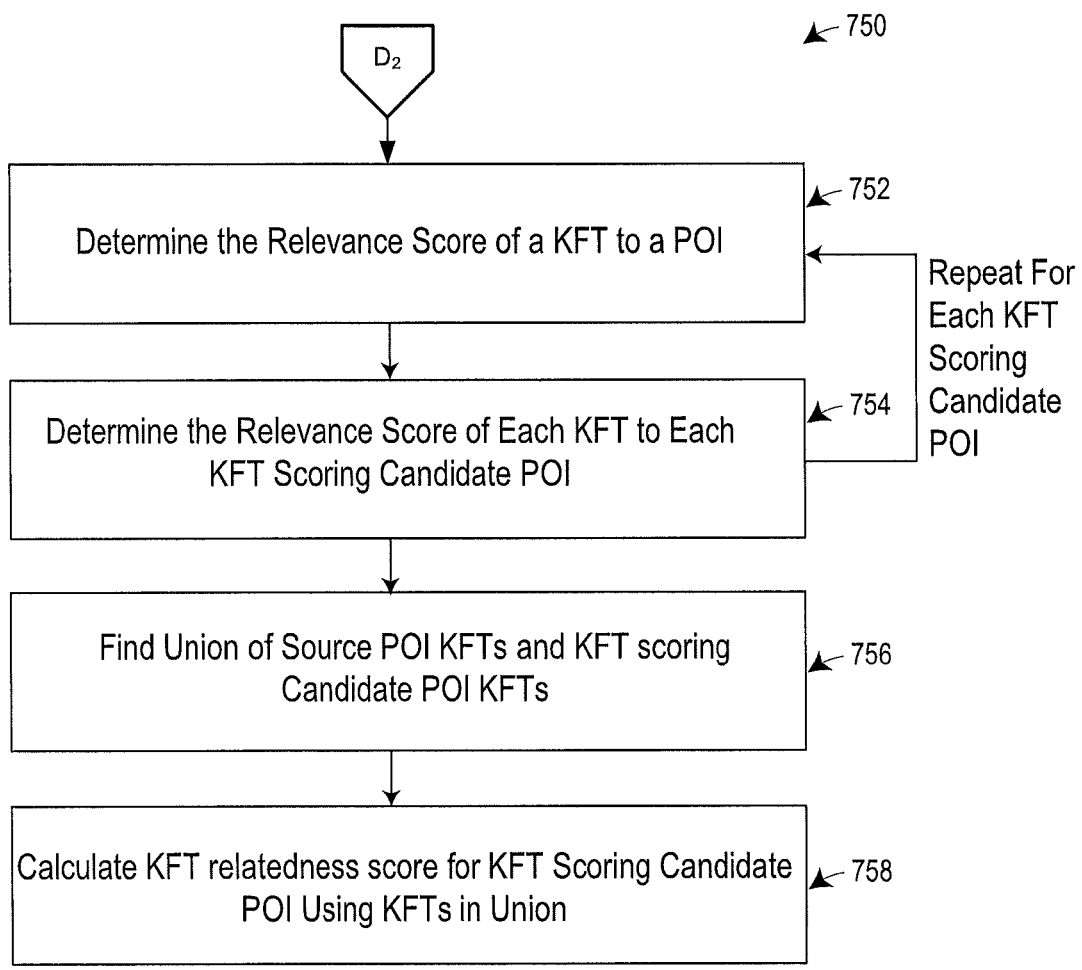
FIG. 7B is another flowchart illustrating a high level overview of a method for determining KFT relevance scores and KFT relatedness scores.

With reference to FIG. 7B, a process 750 may calculate the KFT relatedness scores. Step 752 may include instructions to convert each base score (709, 710, 711, etc) for the KFT to a KFT relevance score 712-714 for each KFT 706-708 that represents the KFT's relevance to a particular point of interest 705 that the system may use to determine the KFT relatedness scores. In some embodiments, step 752 includes instructions to determine the KFT relevance scores 712-714 using Equation 4, below. $R_{KFT}(p,i)$ represents the relevance score of the ith KFT associated with a particular point of interest (p). $Score_p(KFT_i)$ is the base score associated with $KFT_i$, and $score_p(KFT_0)$ is the base score that has the highest base score of all KFTs associated with a KFT scoring candidate point of interest:

$$R_{KFT}(p, i) = \frac{\log_2(score_p(KFT_i))}{\log_2(score_p(KFT_0))} \quad \text{Equation 4}$$

Step 754 may include instructions to calculate relevance scores for each KFT $R_{KFT}(p,i)$ for each KFT scoring candidate point of interest. Step 756 may include instructions to determine the intersection of the KFTs associated with a particular KFT scoring candidate point of interest and the source point of interest KFTs. Step 758 may include instructions to calculate a KFT relatedness score for a KFT scoring candidate point of interest using Equations 5 and 6, below. Equations 5 and 6 may include KFT relevance scores $R_{KFT}(p,i)$ that are part of the intersection of KFTs determined at step 756.

$$POI\ relatedness_{KFT} \sum_{i=0}^{KFT_{selected\ POI} \cap KFT_{current\ POI}} \frac{\min[R_{KFT}(\text{selected } POI, i), R_{KFT}(\text{current } POI, i) + freq(KFT_i)]}{2} \quad \text{Equation 5}$$

$$freq(KFT_i) = \frac{1}{(\text{\# of } POIs \text{ with this } KFT)^{K_2}} \quad \text{Equation 6}$$

Figure 6B:
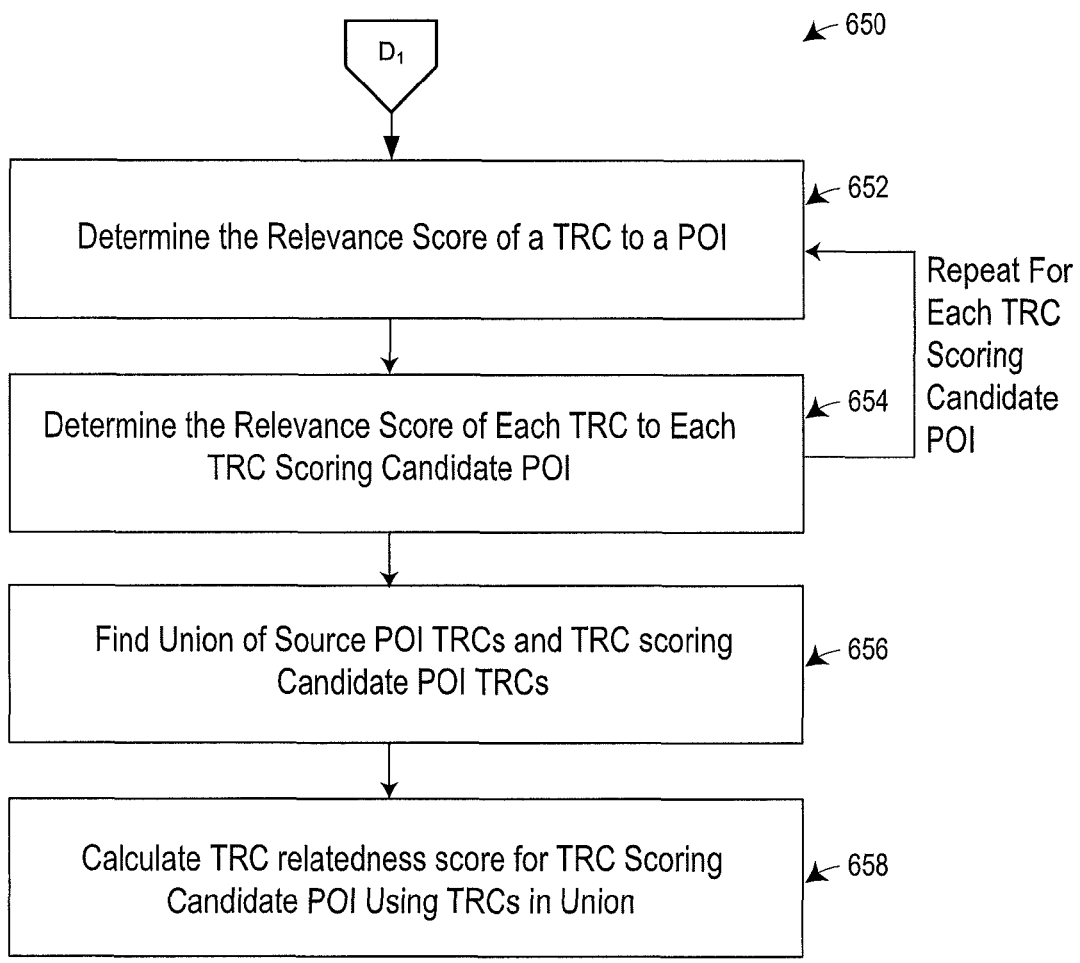
FIG. 6B is another flowchart illustrating a high level overview of a method for determining TRC relevance scores and TRC relatedness scores.

As described with reference to FIG. 6B, the exponent $K_2$ in the denominator of Equation 6 may be used to weigh the score more or less against KFTs that may be more or less common. For example, "Food" may be a very common KFT and, thus, the exponent $K_2$ weigh the score against this KFT. Similarly, the exponent $K_2$ may weigh the score favorably toward a unique KFT.

Returning to FIG. 3B, step 338 may include instructions to calculate a total relatedness score for each Known for Term (KFT) and Topical Refinement Category (TRC) scoring candidate point of interest using the KFT and TRC relatedness scores from step 336, as described above. In some embodiments, step 338 may include instructions to execute Equation 7 to calculate the total relatedness score for each KFT and TRC scoring candidate:

$$\text{total score}_i = \text{weight}_{KFT} * \text{total}_{KFT} + \text{weight}_{TRC} * \text{total}_{TRC} \quad \text{Equation 7}$$

Step 338 may also include instructions to weigh the KFT relatedness score or TRC relatedness score using Equation 7. The instructions in step 338 may weigh the KFT relatedness score or the TRC relatedness score using the TRCs associated with the point of interest and may determine that either the TRCs or the KFTs differentiate the point of interest. For example, the instructions in step 338 may cause the system 100 to weigh the TRC relatedness score for a hotel POI higher than the KFT relatedness score because all hotel POIs may share many common KFTs (e.g., lounge, bed, bathroom, etc.). Conversely, the instructions in step 338 may cause the system to weigh the TRC relatedness score for a restaurant point of interest lower than the KFT relatedness score because a restaurant is typically highly differentiated among other restaurants and, thus, restaurants generally do not share KFTs.

Returning to FIG. 3A, step 308 uses the total relatedness score for each TRC and KFT scoring candidate point of interest, together with the KFTs and TRCs for each point of interest to determine the various related places to plot on the map 200. In some embodiments, step 308 includes instructions to determine a mix of alternative, accessory, and complimentary points of interest from the KFT and TRC scoring candidates using the total relatedness scores, KFTs and TRCs, as described above, as well as a current zoom level and user context information to determine the related places to plot. For example, a user near a downtown area may perform a search. If context indicates that the user is driving (e.g., determined by current speed) and the current zoom level of the displayed map 200 includes the downtown area, then step 308 may include instructions to select accessory and complimentary points of interest (e.g., parking lots, gas stations, etc.) that may be within driving distance from the search terms or source point of interest. If, however, the user performs the search while the context indicates walking or living near the downtown area very near the search terms or source point of interest, step 308 may include instructions to exclude accessory points of interest for driving (e.g., parking lots). Likewise, if the user context indicates that the user is using public transportation, then train stations may be included as accessories or points of interest.

Step 308 may also include instructions using zoom levels to determine which points of interest, including alternatives, compliments, and accessories, to plot on the map. For example, at a citywide zoom level, the user is most likely not interested in parking lots nearby the source point of interest. The user is more likely interested in alternatives, or possibly highly rated points of interest within the city. At a wide zoom level, the mix may lean heavily towards alternatives and highly rated points of interest, and away from accessories and compliments. The user is most likely not interested in alternatives if the zoom level is very close to the source point of interest. When the zoom level is very close to the source point of interest, the user is more likely interested in accessories such as parking or ATMs.

Step 308 may also include instructions to select a number of alternatives, accessories, and compliments such that the map is not cluttered. Thus, step 308 may include instructions to determine which results to plot based on a relatedness score threshold, with alternatives, accessories, and compliments falling above or below the threshold. For example, step 308 may include instructions to set the relatedness score threshold such that approximately twenty results are available to plot on the map 200. The processor 107 at step 330 may exclude results with relatedness scores that fall below the scoring floor. The relatedness score threshold may shift based on the number of results and the spatial distribution of the scores within the resulting digital map. For example, the relatedness score threshold may be lowered where the map 200 covers a large area (due to zoom level, display area, etc.) or may be raised where the map 200 covers a small area.

In some cases, the system 100 may not display alternatives, accessories, or compliments. For example, the system 100 may not resolve the search terms/source point of interest if a search is for a broad category, such as "Banks". In this case, the user may select a particular search result from a search for "Banks" and the system 100 may determine points of interest from the user's selection. In another case, the boundaries of the map may be very large or the zoom level very low where any user search would cover an entire state, for example. Alternatives, accessories, and compliments may not be interesting to the user when the boundaries of the map may be very large or the zoom level is very low.

Step 310 may include instructions to plot alternatives, accessories, and compliments on the map 200. In some embodiments, step 310 may include instructions to plot the alternatives with Known for Terms (KFTs) displayed beneath the title, and accessories and compliments without the KFTs. Further, step 310 may include instructions to plot results with higher relatedness scores in a larger font or with distinctive features to indicate those results may be of more interest to the user. If social networking data is available for the search result, step 310 may include instructions to plot hyperlinks or other selectable graphic objects beneath the related POI title to allow users to share information.

Figure 8:
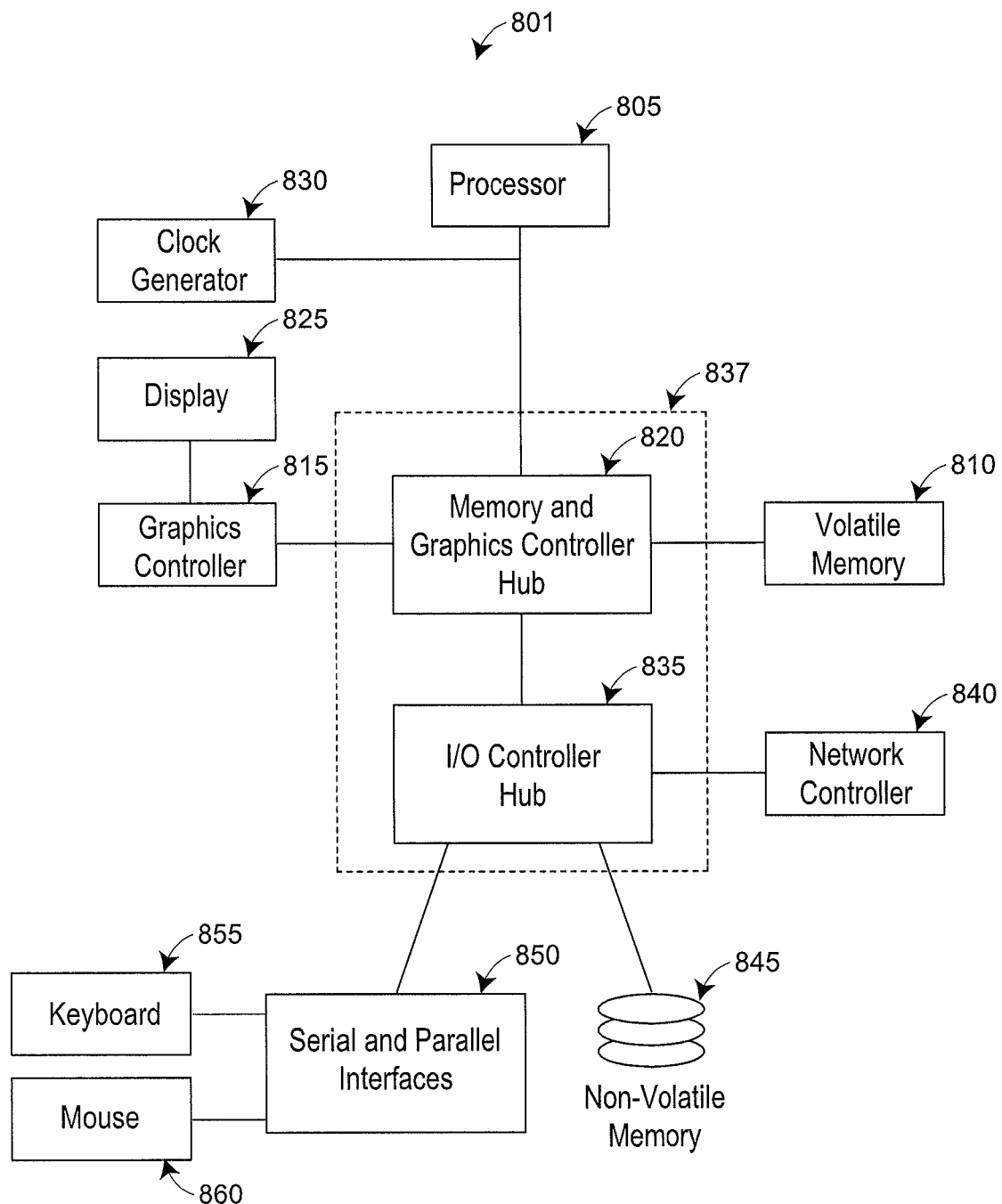
FIG. 8 is an exemplary computing system that may implement various portions of the system for highlighting points of interest within a digital map where the highlighted points of interest are related to a selected point of interest.

FIG. 8 illustrates a generic computing system 801 that the system 100 may use to implement the front-end client 104 in FIG. 1, and/or the back-end mapping system 102. The generic computing system 801 comprises a processor 805 for executing instructions that may be stored in volatile memory 810 (e.g., processes 301, 331, 450, 550, 650, and 750). The memory and graphics controller hub 820 connects the volatile memory 810, processor 805, and graphics controller 815 together. The graphics controller 815 may interface with a display 825 to provide output to a user. A clock generator 830 drives the 805 processor and memory and graphics controller hub 820 that may provide synchronized control of the system 801. The I/O controller hub 835 connects to the memory and graphics controller hub 820 to comprise an overall system bus 837. The hub 835 may connect the lower speed devices, such as the network controller 840, non-volatile memory 845, and serial and parallel interfaces 850, to the overall system 801. The serial and parallel interfaces may 850 include a keyboard 855 and mouse 860 for interfacing with a user.

FIGS. 1-8 illustrate a system and method for highlighting related points of interest within a geographical region. The system comprises a front-end client that receives user interactions and context and displays maps with highlighted related points of interest. The back-end mapping system determines related points of interest to a selected point of interest through relatedness scores determined with data stored in databases. The method provides the user a mix of alternatives, accessories, and compliments based on the users context and relatedness scoring based on data stored in databases.

The following additional considerations apply to the foregoing discussion. Throughout this specification, plural instances may implement processes, steps, functions, components, operations, or structures described as a single instance. Although individual functions and instructions of one or more processes and methods are illustrated and described as separate operations, the system may perform one or more of the individual operations concurrently, and nothing requires that the system perform the operations in the order illustrated. The system may implement structures and functionality presented as separate components in example configurations as a combined structure or component. Similarly, the system may implement structures and functionality presented as a single component as separate components. These and other variations, modifications, additions, and improvements fall within the scope of the subject matter herein.

For example, the network 106 may include but is not limited to any combination of a LAN, a MAN, a WAN, a mobile, a wired or wireless network, a private network, or a virtual private network. Moreover, while FIG. 1 illustrates only one client-computing device to simplify and clarify the description, any number of client computers or display devices can be in communication with the mapping system 102.

Additionally, certain embodiments are described herein as including logic or a number of components, modules, or mechanisms. Modules may constitute either software modules (e.g., code or instructions embodied on a machine-readable medium, wherein a processor executes the code) or hardware modules. A hardware module is tangible unit capable of performing certain operations and may be configured or arranged in a certain manner. In example embodiments, software (e.g., an application or application portion) may configure one or more computer systems (e.g., a standalone, client or server computer system) or one or more hardware modules of a computer system (e.g., a processor or a group of processors) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved over appropriate circuits and buses that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, processes, or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical data capable of being stored, accessed, transferred, combined, compared, or otherwise manipulated by a machine. It is convenient at times, principally for reasons of common usage, to refer to such data using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for highlighting related points of interest in a mapping system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system for highlighting related points of interest in a mapping system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying points of interest that are related to a selected point of interest, the method comprising:

receiving a request for mapping system data from a client computing device via a network, the request indicating a selected point of interest (POI) that is displayed at a geographic location within a digital map at the client computing device, the selected POI corresponding to at least one topical refinement category (TRC) stored in a TRC database and a plurality of known for terms (KFTs) stored in a KFT database, each KFT describing a characteristic of the selected point of interest, each TRC corresponding to a TRC base score describing an importance of the TRC compared to a set of all TRCs stored in the TRC database, and each KFT corresponding to a KFT base score describing an importance of the KFT compared to a set of all KFTs stored in the KFT database;

determining one or more POIs that are related to the selected POI, the related POIs each displayed at other geographic locations within the digital map at the client computing device and including at least one TRC that is common to a TRC of the selected POI and at least one KFT that is common to a KFT of the selected POI;

constructing a KFT place graph and a TRC place graph;

determining KFT scoring candidate nodes from the KFT place graph and TRC scoring candidate nodes from the TRC place graph; determining a relevance score for all TRCs of the TRC scoring candidate nodes;

determining a first intersection of the TRCs for all POIs of the POI nodes having an edge to a TRC scoring candidate node and the TRCs of the source point of interest;

determining a TRC relatedness score for each POI having a TRC in the first intersection;

determining a relevance score for all KFTs of the KFT scoring candidate nodes;

determining a second intersection of the KFTs for all POIs of the POI nodes having an edge to a KFT scoring candidate node and the KFTs of the source point of interest;

determining a KFT relatedness score for each POI having a KFT in the second intersection;

determining a total relatedness score including a sum of the TRC relatedness score and the KFT relatedness score; and sending instructions to the client computing device, the instructions causing the client computing device to plot related POIs within the digital map displayed at the client computing device, wherein the plotted, related POIs include a total relatedness score above a threshold.

2. The computer-implemented method of claim 1, wherein:

the KFT place graph includes the selected and related POIs as a first set of KFT place graph nodes and the KFTs of both the selected and related POIs as a second set of KFT place graph nodes, and an edge from each POI of the first set of KFT place graph nodes that includes a KFT of the second set of KFT place graph nodes; and the TRC place graph includes the selected and related POIs as a first set of TRC place graph nodes, the TRCs of both the selected and related POIs as a second set of TRC place graph nodes, and an edge from each POI of the first set of TRC place graph nodes that includes a TRC of the second set of TRC place graph nodes.

3. The computer-implemented method of claim 2, wherein the TRC and KFT scoring candidate nodes include an edge to a node for the selected POI and an edge to one or more nodes for the related POIs.

4. The computer-implemented method of claim 3, wherein the relevance score for all TRCs of the TRC scoring candidate nodes includes a comparison of a TRC base score and a TRC base score having a highest base score of all TRC base scores for the POIs of the POI nodes having an edge to a TRC scoring candidate node.

5. The computer-implemented method of claim 4, wherein each TRC relatedness score includes a minimum between a TRC relevance score for the selected POI and a TRC relevance score for the POI having the TRC in the first intersection, plus an inverse of a number of POIs that include the TRC.

6. The computer-implemented method of claim 5, wherein the relevance score for all KFTs of the KFT scoring candidate nodes includes a comparison of a KFT base score and a KFT base score having a highest base score of all KFT base scores for the POIs of the POI nodes having an edge to a KFT scoring candidate node.

7. The computer-implemented method of claim 6, wherein the KFT relatedness score includes a minimum between a KFT relevance score for the selected POI and a KFT relevance score for the POI having the KFT in the second intersection, plus an inverse of a number of POIs that include the KFT.

8. The computer-implemented method of claim 1, wherein the KFT relatedness score and the TRC relatedness score each include a weighting factor to skew the KFT relatedness score and the TRC relatedness score more or less against a more or less common KFT and TRC, respectively.

9. The computer-implemented method of claim 1, wherein receiving the request for mapping system data includes receiving a text-based search for a POI that is displayed within the digital map at the client computing device.

10. The computer-implemented method of claim 1, wherein the TRC relatedness score for each POI includes the TRC relevance score $R_{TRC}(p,i)$, the TRC relatedness score including:

$$POI\ relatedness_{TRC}$$

$$\sum_{i=0}^{TRC_{selected\ POI} \cap TRC_{current\ POI}} \frac{\min[R_{TRC}(\text{selected } POI, i), R_{TRC}(\text{current } POI, i) + freq(TRC_i)]}{2}$$

wherein $$freq(TRC_i) = \frac{1}{(\#\ of\ POIs\ with\ this\ TRC)^{K_1}}$$

and $K_1$ includes a weighting factor to skew the TRC relatedness score more or less against more or less common KFTs, respectively.

11. The computer-implemented method of claim 1, wherein the KFT relatedness score for each POI includes the KFT relevance score $R_{KFT}(p,i)$, the KFT relatedness score including:

$$POI\ relatedness_{KFT}$$

$$\sum_{i=0}^{KFT_{selected\ POI} \cap KFT_{current\ POI}} \frac{\min[R_{KFT}(\text{selected } POI, i), R_{KFT}(\text{current } POI, i) + freq(KFT_i)]}{2}$$

wherein

-continued $$freq(KFT_i) = \frac{1}{(\# \text{ of } POIs \text{ with this } KFT)^{K_2}}$$

and $K_2$ includes a weighting factor to skew the KFT relatedness score more or less against more or less common KFTs, respectively.

12. A method for displaying points of interest that are related to a selected point of interest in a graphical user interface of a mapping application executing on a client computing device, the method comprising:
sending a request for mapping system data from the client computing device via a network, the request indicating a selected point of interest (POI) that corresponds to a list of words describing characteristics of the selected POI, and each selected POI word including a base score describing an importance of the selected POI word compared to a list of all words corresponding to displayable points of interest (POIs);
receiving, in response to the request, a POI that is related to the selected POI, the related POI including a list of words describing characteristics of the related POIs, the related POI list of words including at least one word that is common to a word within the selected POI list of words, and each related POI word including the base score describing an importance of the related POI word compared to the list of all words; and
plotting the related POI within the graphical user interface of the mapping application executing on the client computing device;
wherein the plotted, related POI includes a total base score above a threshold, the total base score including a value of the base scores for each word of the related POI list of words that is common to a word within the selected POI list of words,
wherein a known for term (KFT) describes a characteristic of the selected POI and corresponds to a KFT base score describing an importance of the KFT compared to a set of KFTs,
wherein a topical refinement category (TRC) describes a category of the selected POI and corresponds to a TRC base score describing an importance of the TRC compared to a set of TRCs, and
wherein the total base score for each related POI includes a comparison between the KFT and TRC base scores for the selected POI and corresponding KFT and TRC base scores for the related POI.

13. A computer-implemented method for displaying points of interest that are related to a selected point of interest, the method comprising:
receiving a request for mapping system data from a client computing device via a network, the request indicating a selected point of interest (POI) that is displayed at a geographic location within a digital map at the client computing device, the selected POI corresponding to at least one topical refinement category (TRC) and a plurality of known for terms (KFTs), the KFTs describing characteristics of the selected POI, each TRC of the selected POI including a TRC base score describing an importance of the TRC compared to a set of possible TRCs, and each KFT of the selected POI including a KFT base score describing an importance of the KFT compared to a set of possible KFTs;
determining one or more POIs that are related to the selected POI, wherein for each of the related POIs:

the related POI includes (i) at least one TRC that is common to a TRC of the selected POI and (ii) at least one KFT that describes a characteristic of the related POI and is common to a KFT of the selected POI,
each TRC of the related POI includes a base score describing an importance of the related POI TRC compared to the set of possible TRCs, and
each KFT of the related POI includes a base score describing an importance of the related POI KFT compared to the set of possible KFTs;
for each related POI, determining a total base score, including comparing (i) the KFT and TRC base scores for the selected POI and (ii) the corresponding KFT and TRC base scores for the related POI; and
sending instructions to the client computing device, the instructions causing the client computing device to plot, within the digital map displayed at the client computing device, each of the related POIs having a total base score above a threshold.

14. The method of claim 13, further comprising:
constructing a KFT place graph including the selected and related POIs as a first set of KFT place graph nodes, the KFTs for both the selected and related POIs as a second set of KFT place graph nodes, and an edge from each POI of the first set of KFT place graph nodes that includes a KFT of the second set of KFT place graph nodes; and
constructing a TRC place graph including the selected and related POIs as a first set of TRC place graph nodes, the TRCs of both the selected and related POIs as a second set of TRC place graph nodes, and an edge from each POI of the first set of TRC place graph nodes that includes a TRC of the second set of TRC place graph nodes.

15. The method of claim 14, further comprising determining KFT and TRC scoring candidate nodes from the sets of TRC and KFT nodes, wherein the TRC and KFT scoring candidate nodes include an edge to a node for the selected POI and an edge to one or more nodes for the related POIs.

16. The method of claim 15, wherein determining the total base score for each related POI includes determining a relevance score for all TRCs of the TRC scoring candidate nodes, the relevance score including:

$$R_{TRC}(p, i) = \frac{score_p(TRC_i)}{score_p(TRC_0)}$$

wherein $R_{TRC}(p,i)$ includes the relevance score of an ith TRC of the selected POI (p), $score_p(TRC_i)$ includes the TRC base score of a $TRC_i$, and $score_p(TRC_0)$ includes a TRC base score having a highest base score of all TRC base scores for the POIs of the POI nodes having an edge to a TRC scoring candidate node.

17. The method of claim 16, wherein determining the total base score for each related POI further includes determining a first intersection of the TRCs for all POIs of the POI nodes having an edge to a TRC scoring candidate node and the TRCs of the source point of interest.

18. The method of claim 17, wherein determining the total base score for each related POI further includes determining a TRC relatedness score (total$_{TRC}$) for each member of the first union using the TRC relevance score R$_{TRC}$(p,i), the TRC relatedness score including:

$$POI\ relatedness_{TRC}$$

$$\sum_{i=0}^{TRC_{selected\ POI} \cap TRC_{current\ POI}} \frac{\min[R_{TRC}(\text{selected } POI, i), R_{TRC}(\text{current } POI, i) + freq(TRC_i)]}{2}$$

wherein $$freq(TRC_i) = \frac{1}{(\#\ of\ POIs\ \text{with this } TRC)^{K_1}}$$

and K$_1$ includes a weighting factor to skew the TRC relatedness score more or less against more or less common TRCs, respectively.

19. The method of claim 18, wherein determining the total base score for each related POI further includes determining a relevance score for all KFTs for the KFT scoring candidate nodes, the relevance score including:

$$R_{KFT}(p, i) = \frac{\log_2(score_p(KFT_i))}{\log_2(score_p(KFT_0))}$$

wherein R$_{TRC}$(p,i) includes the relevance score of an ith KFT of the selected point of interest (p), score$_p$(KFT$_i$) includes the KFT base score associated for a KFT$_i$, and score$_p$(KFT$_0$) includes a KFT base score having a highest base score of all KFT base scores for the POIs of the POI nodes having an edge to a KFT scoring candidate node.

20. The method of claim 19, wherein determining the total base score for each related POI further includes determining a second intersection of the KFTs for all POIs of the POI nodes having an edge to a KFT scoring candidate node and the KFTs of the source point of interest.

21. The method of claim 20, wherein determining the total base score for each related POI further includes determining a KFT relatedness score (total$_{KFT}$) for each member of the second intersection using the KFT relevance score R$_{KFT}$(p,i), the KFT relatedness score including:

$$POI\ relatedness_{KFT}$$

$$\sum_{i=0}^{KFT_{selected\ POI} \cap KFT_{current\ POI}} \frac{\min[R_{KFT}(\text{selected } POI, i), R_{KFT}(\text{current } POI, i) + freq(KFT_i)]}{2}$$

wherein $$freq(KFT_i) = \frac{1}{(\#\ of\ POIs\ \text{with this } KFT)^{K_2}}$$

and K$_2$ includes a weighting factor to skew the KFT relatedness score more or less against more or less common KFTs, respectively.

22. The method of claim 21, wherein determining the total base score for each related POI further includes determining a total relatedness score including a sum of the TRC relatedness score and the KFT relatedness score.

23. The method of claim 22, further comprising plotting all related POIs within the digital map displayed at the client computing device within a digital map displayed at the client computing device, wherein the plotted, related POIs include a total relatedness score above a threshold.

24. A computer system for determining points of interest that are related to a selected point of interest displayed within a digital map of a geographic area on a client computing device, the system comprising:
 one or more processors;
 one or more memories coupled to the one or more processors; and
 a database communicatively coupled to the one or more processors, the database storing topical refinement categories (TRCs) and known for terms (KFTs), the KFTs describing characteristics of points of interest (POIs) displayable within the digital map;
 wherein the one or more memories include computer executable instructions stored therein that, when executed by the one or more processors, cause the one or more processors to:
  receive a request for mapping system data from the client computing device via a computer network, the request indicating a selected POI that is displayed at a geographic location within the digital map, the selected POI corresponding to at least one TRC and a plurality of KFTs, each KFT of the selected POI describing a characteristic of the selected POI, each TRC of the selected POI including a TRC base score describing an importance of the TRC compared to the TRCs stored in the database, and each KFT of the selected POI including a KFT base score describing an importance of the KFT compared to the KFTs stored in the database;
  determine one or more POIs that are related to the selected POI, wherein for each of the related POIs:
   the related POI includes (i) at least one TRC that is common to a TRC of the selected POI and (ii) at least one KFT that describes a characteristic of the related POI and is common to a KFT of the selected POI,
   each TRC of the related POI includes a base score describing an importance of the related POI TRC compared to the TRCs stored in the database, and each KFT of the related POI includes a base score describing an importance of the related POI KFT compared to the KFTs stored in the database;

for each related POI, determine a total base score, at least by comparing (i) the KFT and TRC base scores for the selected POI and (ii) the corresponding KFT and TRC base scores for the related POI; and send instructions to the client computing device, the instructions causing the client computing device to plot, within the digital map displayed at the client computing device, each of the related POIs having a total base score above a threshold.

* * * * *